United States Patent [19]
Yamamoto et al.

[11] Patent Number: 5,343,269
[45] Date of Patent: Aug. 30, 1994

[54] IMAGE PRINTING METHOD AND APPARATUS

[75] Inventors: Yuji Yamamoto; Ikuhiro Tamaki, both of Wakayama, Japan

[73] Assignee: Noritsu Koki Co., Ltd., Wakayama, Japan

[21] Appl. No.: 67,600

[22] Filed: May 27, 1993

[30] Foreign Application Priority Data

May 29, 1992 [JP] Japan ................ 4-138804

[51] Int. Cl.$^5$ ................ G03B 27/52; G03B 27/70
[52] U.S. Cl. ........................ 355/43; 355/45; 355/54; 355/66; 355/23; 355/26
[58] Field of Search ........... 355/43, 45, 54, 60, 355/66, 23, 26

[56] References Cited

U.S. PATENT DOCUMENTS

| Re. 26,771 | 1/1970 | Schwardt et al. | 355/54 |
| 1,802,530 | 4/1931 | Pilny et al. | 355/26 |
| 1,947,668 | 2/1934 | Warmisham | 355/26 |
| 3,512,462 | 5/1970 | Moyroud | 355/54 |
| 3,885,871 | 5/1975 | Galatha et al. | 355/23 |

Primary Examiner—Monroe H. Hayes
Attorney, Agent, or Firm—Wenderoth, Lind & Ponack

[57] ABSTRACT

A method and device for rotating images about an optical axis by changing the direction of a light path by a composite mirror unit having a simple structure. A printing device has a light source for emitting light to an image Xa on a negative film, a printing lens for adjusting the magnification of the light that passes through the image, and a composite mirror unit for reversing the light path to print an image Ya on a printing material. The entire composite mirror unit can be rotated through a predetermined angle about a rotary shaft by a driving motor. The composite mirror unit has two oppositely arranged mirrors which are mounted on separate blocks and so as to be inclined by 45° with respect to the vertical. By turning the unit by ±45° from the reference position (0°), the image will rotate by 90° or 270° with respect to the image Xa.

14 Claims, 7 Drawing Sheets

IMAGE PRINTING METHOD AND APPARATUS

This invention relates to an image printing method for rotating the images on a negative film about the optical axis and printing the images on a web of printing material and an apparatus for the same.

A conventional printing device for printing the images on a film is shown in FIG. 9, in which a negative film wound a round a reel 1 is fed to a film scanner 2 where the image information is read. The film is then fed to a negative mask 3. After having passed the negative mask 3, the film is fed through a feed guide 4 to a film sliver 5 and processed further.

When the film passes through the negative mask 3, it is irradiated with the light emitted from a light source (not shown) providing under the mask 3. The images are thus photographically printed by an overhead printing unit 6. The negative mask 3 is mounted so as to be rotatable by an angle of 90° because the scale of enlargement varies according to the printing size and the size of the negative film.

For higher printing efficiency, printing is ordinarily carried out with the longitudinal sides of the negative film running parallel to the width direction of a web of printing material. If it is desired to change the printing size from size E to size 2E or to change a negative film from 135F to 135H, the film feed direction has to be changed by rotating the negative mask 3 by 90°.

In order to print special-size film such as panorama print, the printing material has to be rewound even during printing to replace it with a printing material having a different width. Then the film feed line is rotated by 90° with respect to the ordinary feed direction.

If the printing size or film size is not normal, it is necessary to change the film feed direction or rewind the printing material as described above. Such work is time-consuming and troublesome. Also, it is difficult to automate the steps of inserting of films into the negative mask and feeding films after printing. It is even more difficult to automate the film processing piece by piece.

Also, a large working space is required because the film feed direction has to be changed. When changing the print size frame by frame, it is complicated to hold the film. Thus, scanner photometry is difficult at other points than along the optical axis.

An object of this invention is to provide a simple method and apparatus for printing images which if the size of the negative film or printing size changes, can print without changing the feed direction of the negative film.

The present invention provides a method of printing images, comprising the steps of feeding a web of printing material parallel to a negative film fed in a predetermined direction, emitting light from one side of the negative film, reflecting the light that has passed through the negative film by a pair of mirrors provided opposite to each other so that the light will hit upon the printing material, with the optical path of the light rotated by a predetermined angle from a reference position which is perpendicular to the negative film and the printing material, thereby printing an image obtained by rotating the image on the negative film by a predetermined angle about the optical axis, on the printing material.

The optical path may be rotated by the predetermined angle by rotating one or both of the mirrors about a position offset by a predetermined distance from the optical axis of the light.

Preferably, the predetermined angle of rotation of the optical path is 0° or 45° or −45° from the reference position and wherein the offset position is a point which is offset by 45° from the reference position and by a predetermined distance from the optical axis of the light.

Alternatively, the mirrors provided opposite to each other may be a pair of mirrors provided at the reference position, wherein another opposed pair of mirrors are provided in a juxtaposed relation with the first pair of mirrors at a predetermined angular position, and wherein the optical path is rotated by a predetermined angle by moving the mirrors to positions where the optical axes of two pairs of mirrors coincide with each other.

This invention also provides an apparatus for printing images on a web of printing material fed in parallel to a negative film, the apparatus comprising a light source for irradiating the negative film, a printing lens for adjusting the magnification of the light that has passed through the negative film, a composite mirror unit having a pair of mirrors arranged opposite to each other for changing the optical path of the light that has passed through the negative film, a driving means for rotating or moving at least one of the mirrors of the composite mirror unit to rotate the optical path by a predetermined angle from a reference position which is perpendicular to the negative film and the printing material, whereby an image obtained by rotating an image on the negative film by a predetermined angle can be printed on the printing material.

The composite mirror unit may comprise a pair of mirrors for reversing the optical path, the driving means being capable for rotating the mirrors about a position which is offset by a predetermined angle from the reference position and by a predetermined distance from the optical axis of the light source.

Alternatively, the composite mirror unit may comprise a plurality of pairs of mirrors, one of the mirrors being rotatably mounted at the side of the optical axis of the light source, while the other of the mirrors, located at the side of the printing material, being fixedly mounted at different angular positions to which the optical path is intended to be rotated and wherein the driving means is for rotating the rotatable mirror about a position which is offset by a predetermined angle from the reference position and by a predetermined distance from the axis of the light whereby the rotatable mirror is selectively combined, by rotating it, with the fixed mirrors at the respective angular positions to form the plurality of pairs of mirrors.

Also, the composite mirror unit may be an integral unit comprising a plurality of pairs of mirrors, one of the plurality of pairs of mirrors being fixed at the reference position, while the other pairs of mirrors being fixed in different angular positions to which the optical path is intended to be rotated, and wherein the driving means is for moving the integral unit along the negative film, so that by moving the composite mirror unit by the driving means, the optical path can be rotated by selectively using the pair of mirror at a predetermined angular position.

The above-described apparatus for printing images may further comprise a plurality of paper magazines and feed means for changing the webs of paper to be fed from the respective paper magazines to an exposing unit, control means for moving the web of paper backward and forward according to the printing conditions when rotating images.

The steps of rotating the images, changing the magnification of printing and changing the webs of paper may be automatically carried out in response to signals from a detecting device for changing the print size and the film type.

The signals may be ones from a switch circuit connected to a control circuit.

If the mirrors are set so that the image is rotated by e.g. 90° or 270°, the length-to-width ratio of the image printed on the printing material will be inverted with respect to the length-to-width ratio of the original image on the negative film by properly adjusting the magnification. Thus, the direction in which images are printed and thus the printing size can be changed freely without changing the feed direction of the negative film. This makes it possible to automate the printing steps and improve the efficiency of printing and eliminate the necessity of providing a working space.

Other features and objects of the present invention will become apparent from the following description made with reference to the accompanying drawings, in which.

Figure 1:
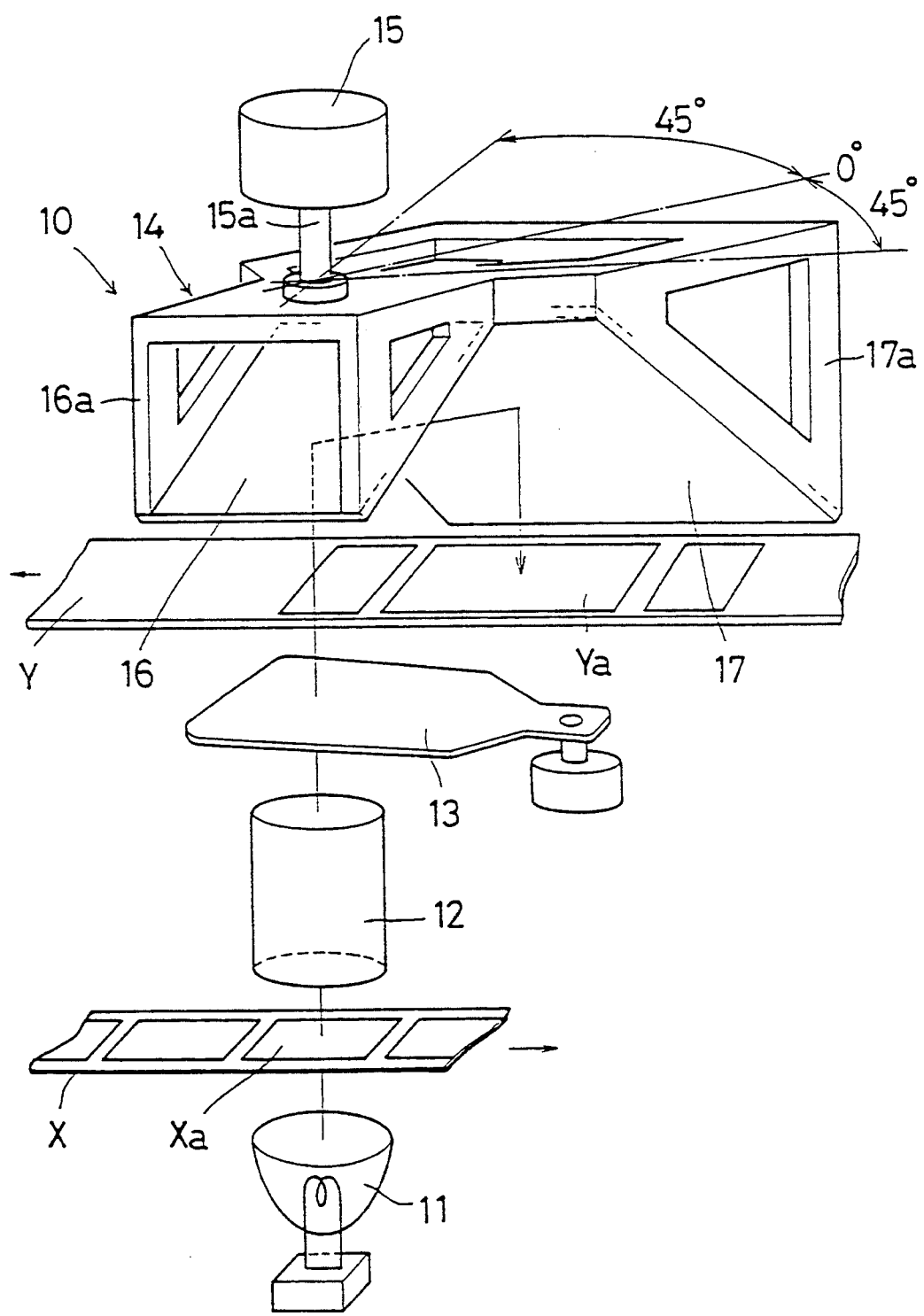
FIG. 1 is a perspective view showing the printing unit of the first embodiment.

In FIG. 1, a photographic negative film X is fed in the direction shown by arrow. A web of printing material Y is fed in the opposite direction shown by arrow, parallel to and spaced a predetermined distance from the negative film. A printing device 10 is provided at a predetermined position with respect to the material Y as shown.

In any of the embodiments to be described hereinbelow, the printing device 10 is mounted as a unit in a unit case, which is not shown in any figure to show the main part clearly.

The printing device 10 comprises a light source 11 for irradiating the negative film X with light from below, a printing lens 12 for adjusting the magnification of the image light that has passed through the image Xa on the negative film, a shutter 13 for limiting the duration of passage of the image light, a composite mirror unit 14 for reversing the optical path of the image light to guide the light onto the printing material Y, and a driving motor 15 mounted on a block of the mirror unit.

Since the light source 11, printing lens 12 and shutter 13 are conventional ones, no further description will be necessary. The composite mirror unit 14 will be described in detail below.

Figure 2:
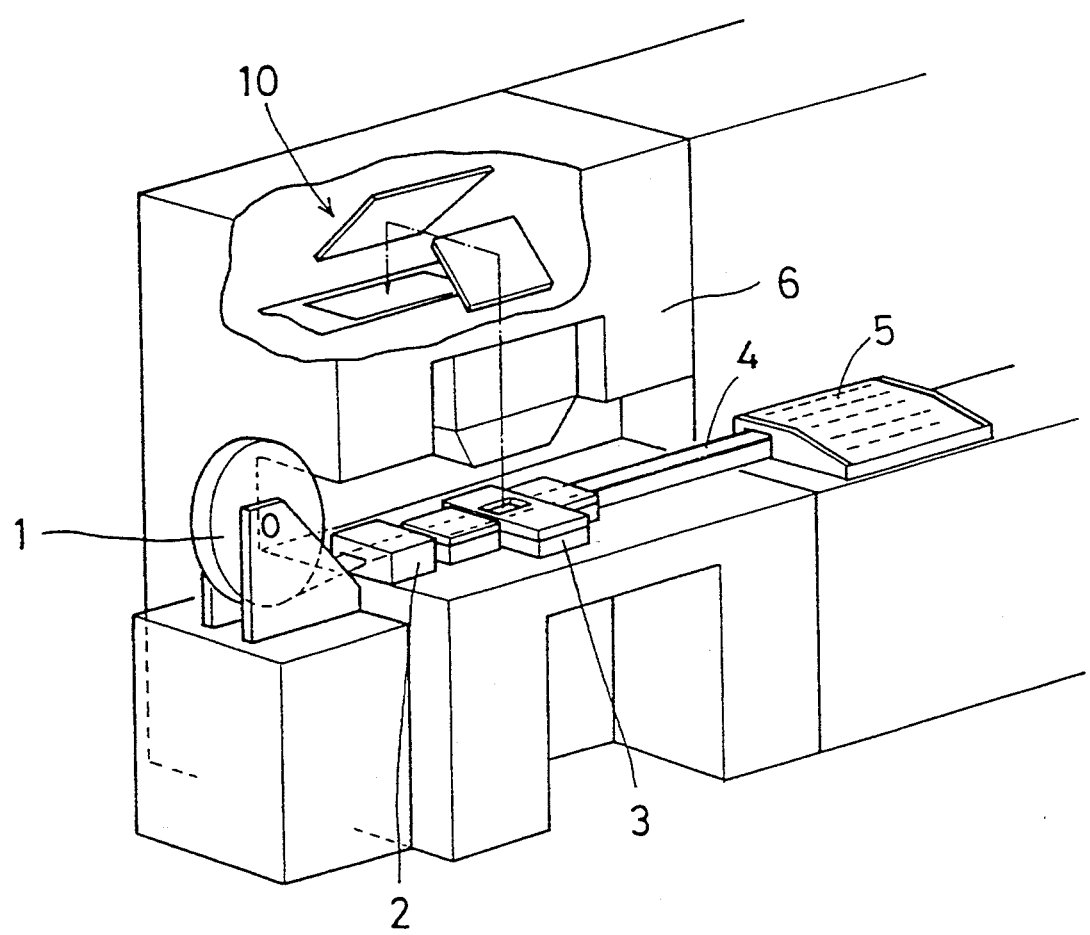
FIG. 2 is a perspective view of the entire printing apparatus equipped with the printing unit of FIG. 1.

As shown in FIG. 2, the printing device 10 is mounted corresponding to the mounting position of a negative mask 3 as in the conventional printing unit. In FIG. 2, numeral 1 designates a reel, 2 is a film scanner, 4 is a carrier guide, 5 is a film sliver, and 6 is a printing station.

Figure 3:
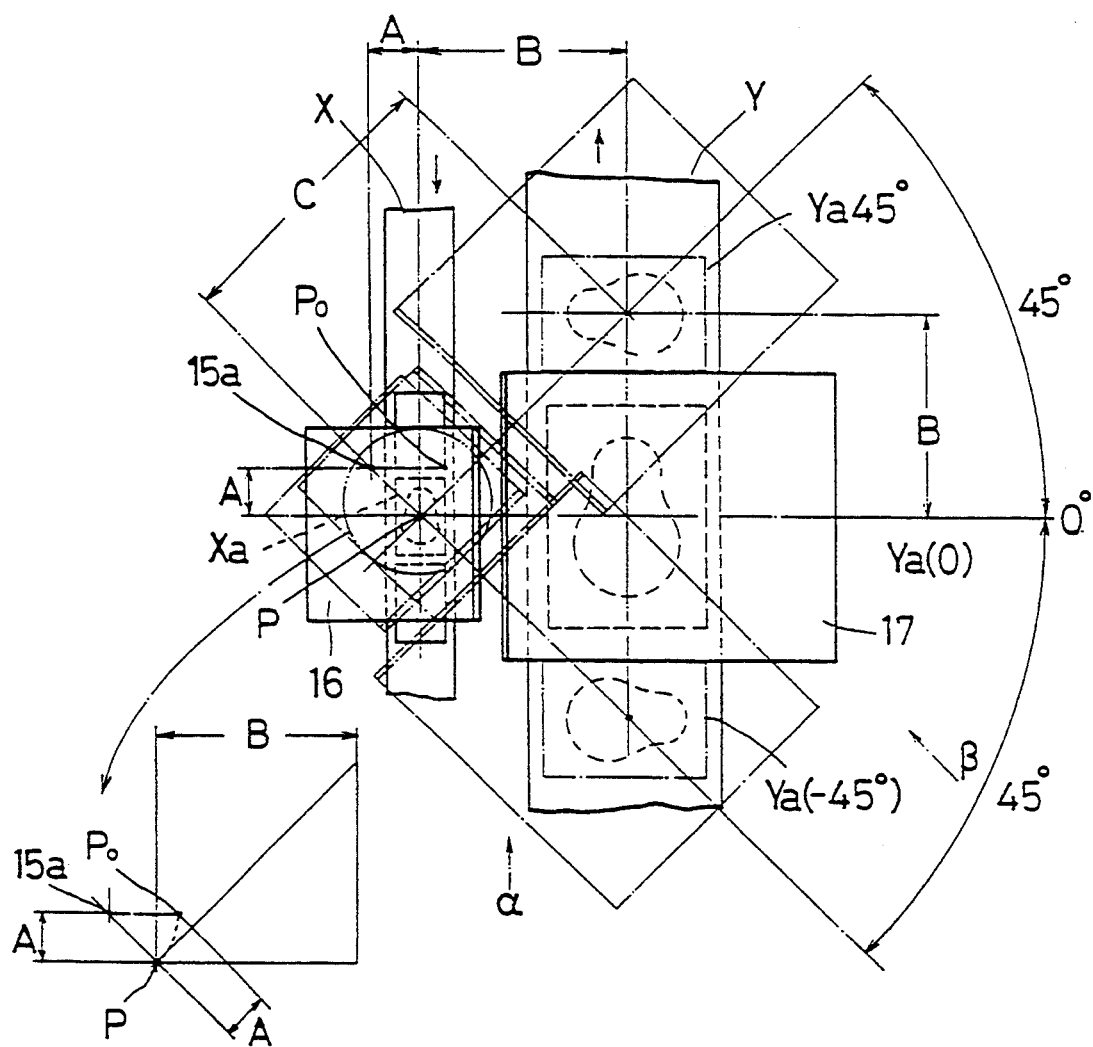
FIG. 3 is a plan view of the composite mirror unit in the printing unit of FIG. 1.

FIG. 3 shows a plan view of the composite mirror unit 14. It comprises two mirrors 16, 17 disposed opposite to each other. As shown in FIG. 1, the mirrors 16, 17 are mounted, respectively, on the inclined surfaces of blocks 16a and 17a having a triangular section. The blocks have their opposite ends connected together, forming an integral unit. The inclined surfaces of the blocks and thus the two mirrors 16, 17 are inclined by an angle of 45° with respect to the vertical direction so as to oppose to each other.

The driving motor 15, mounted on the block 16a, has its rotary shaft 15a journaled on a bearing (not shown) mounted on the peripheral wall of the unit.

Figure 4:
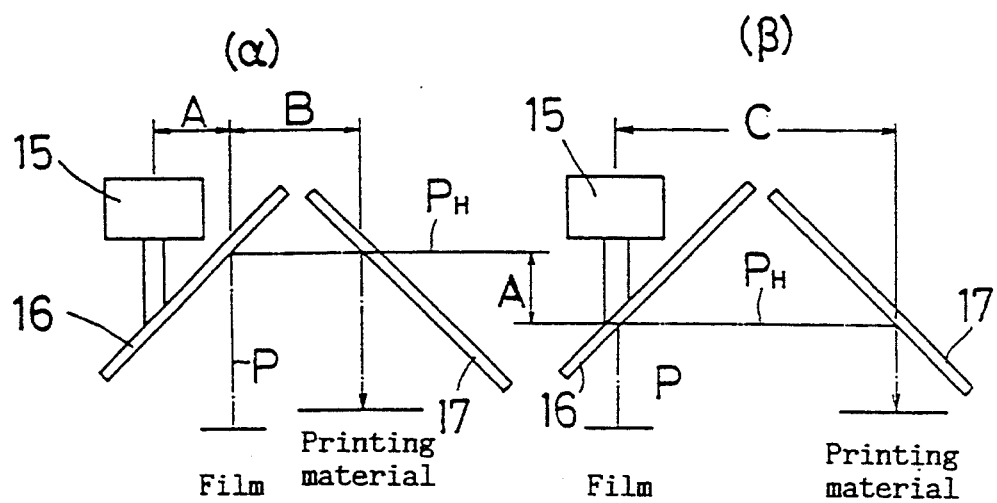
FIGS. 4A and 4B are side views as viewed from the directions $\alpha$ and $\beta$.

As shown in FIG. 3, the mirror 16 is located right over an image Xa on the negative film X. The optical axis P of the light from the light source provided under the negative film X passes through substantially the center of the image Xa. The mirror 17 is positioned so that the direction in which it is opposed to the mirror 16 is perpendicular to the printing material Y and so that after the light from the light source has passed through the image, it is reflected by the mirrors 16 and 17 and hits upon the printing material (FIG. 4). The image will be transferred onto the material Y at substantially the central part thereof with respect to the direction of width of the material. The direction of the optical path reflected by the two mirrors which is perpendicular to the printing material and the negative film is hereinafter referred to as a reference position.

As described above, the mirrors 16, 17 are integral with each other. They are rotated by the driving motor 15 about an axis 15a spaced apart a predetermined distance from the optical axis P and angularly offset by a predetermined angle from the reference position. In this embodiment, as shown in FIG. 3, the axis 15a is offset by 45 from the optical axis P with respect to the reference position and is spaced apart a distance A both from the reference position and the longitudinal central axis of the negative film, which passes the optical axis P.

The distance A is determined so as to satisfy the equation $A = (C - B)/2$, wherein as shown in FIG. 3, B is the distance between the centers of the images on the negative film and the printing material in the reference position, and C is the distance between the centers of the images when they are rotated by 45°. The sizes of the mirrors 16, 17 have to be large enough to reflect the entire images on the negative film and the printing film at any positions shown in FIG. 3.

Using the above-described printing device, images are rotated and printed on the printing material Y in the following manner.

First, we shall describe how printing is done at the reference position (0°). The original image Xa on the negative film X is magnified at a certain same rate both longitudinally and laterally and printed as an image Ya on the printing material Y. Since the image Xa is not rotated, the phases of both images are identical.

When the mirror unit carrying the mirrors 16, 17 is rotated counterclockwise about the offset axis 15a by 45°, the mirrors 16, 17 are moved to the position shown by chain line in FIG. 3. Since the position of the optical axis P is not changed, the optical axis P reflected in the mirror 16 changes relatively. The reflecting point where the optical axis P changes its direction by 90° by being reflected by the mirror 16, when the mirrors 16, 17 are viewed from the direction β after rotating the mirrors by 45°, becomes lower by the distance A than the reflecting point when the mirrors 16, 17 are viewed from the direction α at the original reference position, as shown in FIG. 4. We shall describe the reason hereinbelow.

Because the reflecting point is lowered, the length of the horizontal optical path PH extending between the two mirrors 16, 17 increases from B to C as shown in FIG. 4. This means that, as viewed from top as in FIG. 3, the center of the image moves to the point spaced apart a distance C from the optical axis P and inclined by 45°.

Thus, the distance between the center of the image Ya (45°) and the reference position is equal to B because the angle of rotation is 45°, and is equal to the distance B between the center of the negative film and that of the printing material at the reference position. (FIG. 3)

To put it oppositely, by setting to satisfy the equation $A=(C-B)/2$, the respective points can be set to be arranged as described above. The reflecting point P of the optical axis at the reference position moves as the mirrors 16, 17 rotate. It moves to the point $P_0$ when rotated by 45°. This is because if the point $P_0$ is on a straight line that crosses the optical path PH at a right angle, the distance between the point $P_0$ and the straight line that passes the center of rotation 15a and the optical axis P is equal to the distance A and its vertical distance is also equal to A.

As the mirrors 16, 17 are rotated by 45°, the image Ya (45°) reflected by the mirror 17 and transferred onto the printing material is rotated by 90° with respect to the original image Xa on the negative film. The size of the image is adjustable by adjusting the magnification of the printing lens 12. Thus, by adjusting the magnification so that its width is smaller than the width of the printing material, the image Ya (45°) will be printed as shown in FIG. 3.

If the image Ya (45°) is compared with the original image Xa, the image Ya is obtained by rotating the original image Xa by 90° about the optical axis. If, for example, the original image Xa is a half-sized one, the length-to-width ratio of the original image will be inverse to the image Xa shown in FIG. 3. Since the length-to-width ratio of the image Ya (45°) when it is rotated by 45° is also inverted, an image having the same length-to-width ratio as the image Ya (0°) at the reference position shown in FIG. 3 can be printed at a position angularly rotated by 45° by adjusting the magnification. Namely, simply by rotating the unit carrying the two mirrors 16, 17 with the motor, even if the length-to-width ratio of an image on the negative film has changed, it is possible to print in the same manner as in printing a full-size film without the need of changing the direction of feed of negative film.

The above description concerns the case where the unit carrying two mirrors 16, 17 is rotated by 45° counterclockwise. The situation will be the same when the unit is rotated clockwise. In this case, the image on the printing material will be the same as an image obtained by rotating the original image by 270° in the counterclockwise direction.

In this case, however, since the distance between the center of the image Ya (−45°) and the center of rotation 15a is different, the image Ya formed by rotating the two mirrors 16, 17 is not formed at exactly the same position with respect to the mirror 17 as the image formed by rotating the mirrors by +45°, but at a position slightly offset therefrom.

Figure 5:
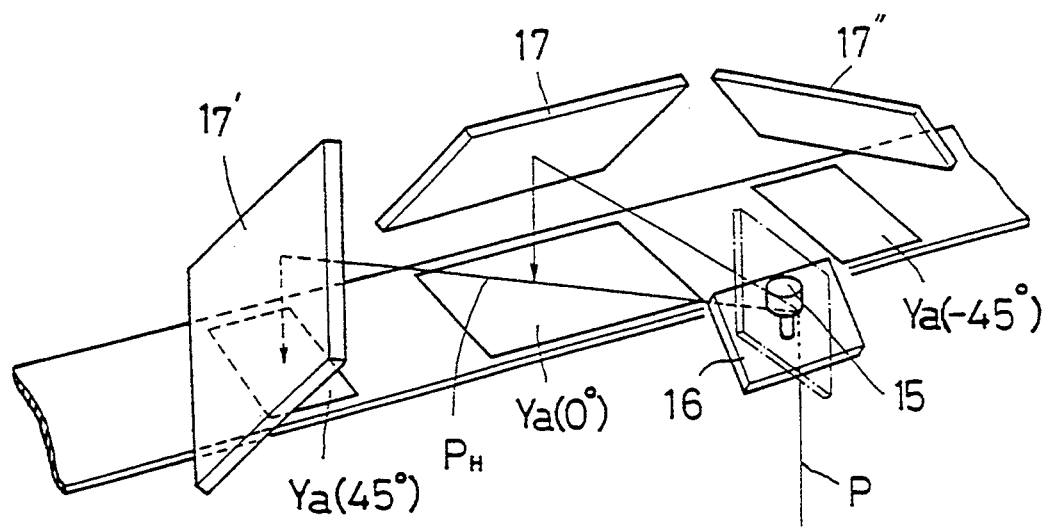
FIG. 5 is a perspective view showing the printing unit of the second embodiment.

FIG. 5 is a perspective view showing the printing device of the second embodiment. This embodiment is different from the first embodiment in that, in place of the two mirrors 16, 17 of the first embodiment, a rotatable first mirror 16, a second mirror 17 fixed at the reference position, a third mirror 17' and a fourth mirror 17'' are used. The third and fourth mirrors are fixed, respectively, at the positions angularly offset therefrom by ±45°.

Its function is the same as that of the first embodiment. Thus, its description is omitted.

Figure 6:
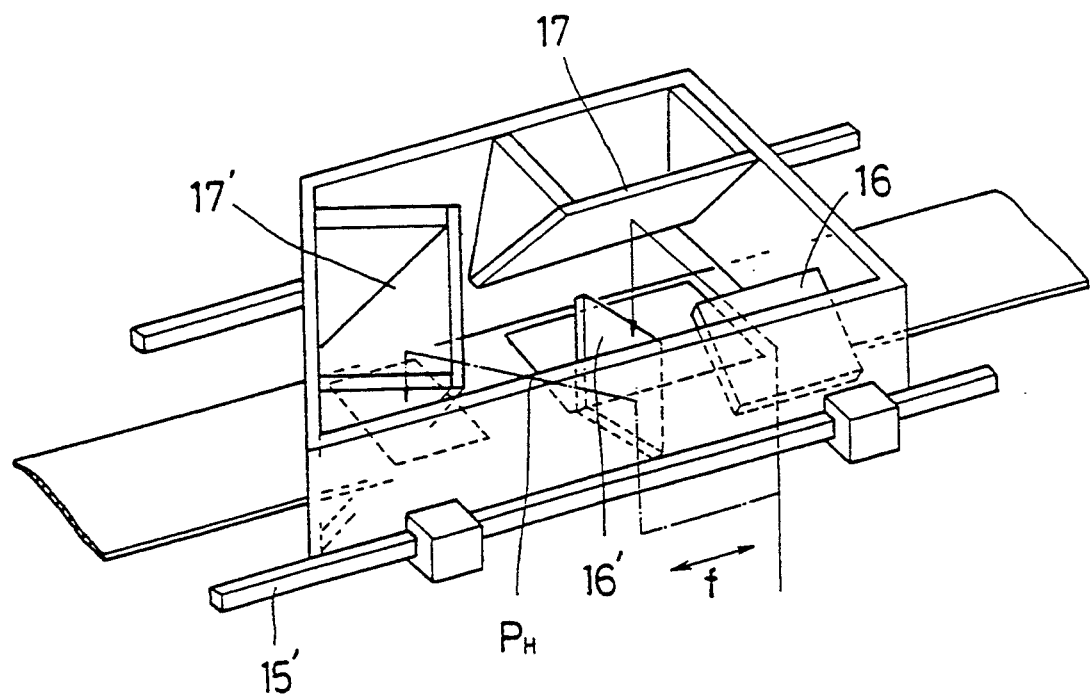
FIG. 6 is a perspective view showing the printing unit of the third embodiment.

FIG. 6 is a perspective view showing the printing device of the third embodiment. In this embodiment, two mirrors 16, 17 in the first embodiment are fixedly mounted at the reference position, and two mirrors 16', 17' arranged opposite to each other at positions rotated by 45° are provided in juxtaposition with the first pair of mirrors, and these four mirrors are coupled together as an integral unit.

Another difference is that, instead of rotatably mounting the mirrors 16, 17, 16' and 17', the entire mirror unit can be moved in the direction of arrow f by means of an unillustrated driving device such as a slide threaded shaft 15'.

When the entire mirror unit is moved by the driving unit to the position where the second pair of mirrors 16', 17' come to the position of the first pair of mirrors 16, 17 at the reference position, the direction of the optical path PH is rotated by 45° in the same manner as in the first embodiment. Thus, its function is exactly the same as the first embodiment.

Though not shown, it will be needless to say that by providing a third pair of mirrors 16'' and 17'', the image can be rotated by −45° from the reference position.

Figure 7:
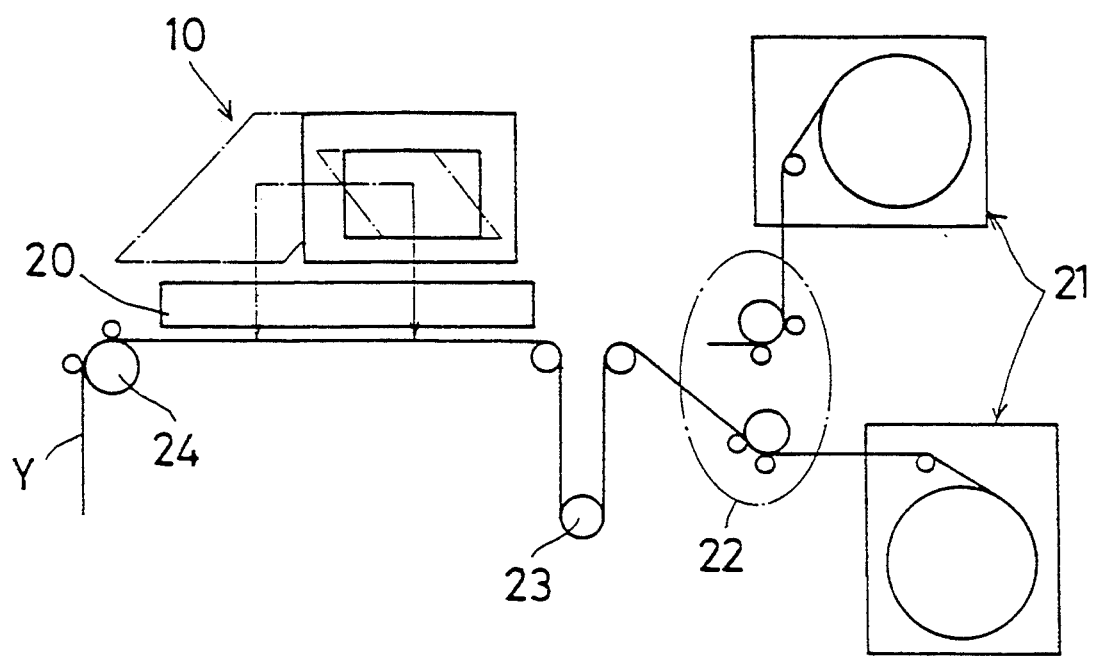
FIG. 7 is a schematic view of the device for feeding webs of paper to the printing unit of one of the embodiments.

FIG. 7 shows a device for feeding the printing material to the printing unit of any of the embodiments. This feed device comprises a paper mask 20, a plurality of paper retaining portions 21, a paper feeding portion 22 capable of exchanging webs of paper, a dancer roller 23 provided in the paper travel path and a feed roller 24. Web of paper is fed from this feed device to a paper mask 20 equipped with the printing unit of one of the abovesaid embodiments.

During printing with the printing unit 10, an unexposed portion may appear between a previously printed surface and a printing surface after the image has been rotated. In such a case, this feed device can rewind paper in the direction opposite to the normal feed direction.

When rewinding paper, it may slacken. In order to prevent this, tension is applied to the paper by means of the dancer roller. Thus, the paper can be rewound by a predetermined length without becoming slack. By providing the above-described paper feed device, the print size can be changed over automatically with high efficiency.

Figure 8:
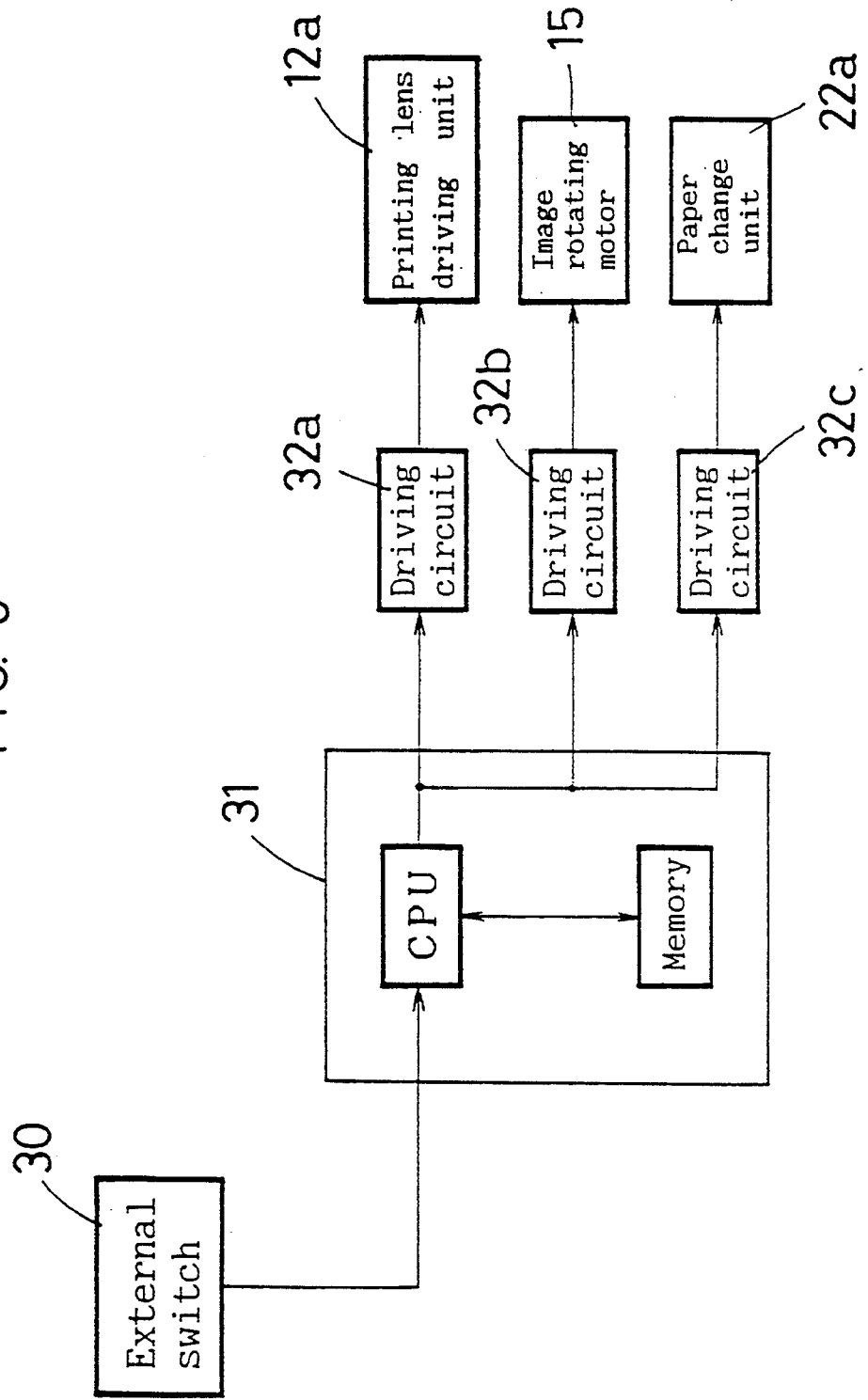
FIG. 8 is a block diagram of the changeover device for any of the embodiments and the paper feed device.
Figure 9A:
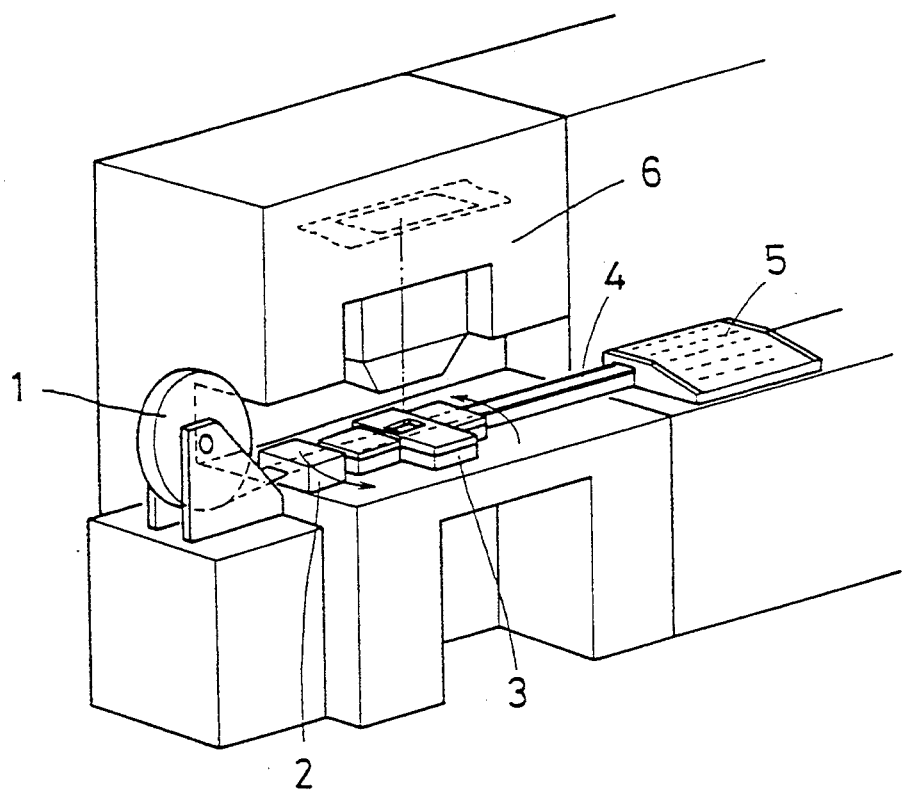
FIGS. 9A and 9B are perspective views showing a prior art printing device.
Figure 9B:
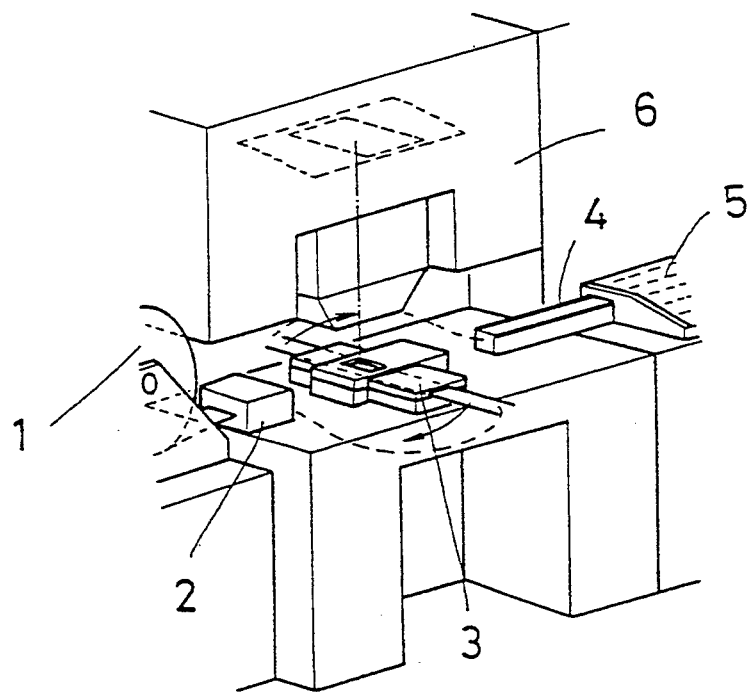

FIG. 8 shows a block diagram of a control device for driving a changeover device for the printing lens, image rotating motor, and paper feed device.

An external switch 30 is a switch such as a keyboard which can feed various signals from outside. The switch signals are fed to a CPU of a control circuit 31. The CPU processes the signals to calculate timing, pulse widths, etc. and outputs control signals. Driving circuits 32a, 32b and 32c are provided to drive the driving unit 12a for the printing lens 12, the image rotating motor 15 and the paper changeover device 22a, respectively.

A desired print size is selected by the control signals from the external switch 30. The control signals are used as sequential signals to drive the driving unit for the printing lens and the image rotating motor 15. When these members are ready for printing, printing paper is fed.

What is claimed is:

1. A method of printing images, comprising the steps of feeding a web of printing material parallel to a negative film fed in a predetermined direction, emitting light from one side of the negative film, reflecting the light that has passed through the negative film by a pair of mirrors provided opposite to each other so that the light will hit upon the printing material, with the optical path of the light rotated by a predetermined angle from a reference position which is perpendicular to the negative film and the printing material, thereby printing an image obtained by rotating the image on the negative film by a predetermined angle about the optical axis, on the printing material.

2. A method of printing images as claimed in claim 1 wherein said optical path is rotated by the predetermined angle by rotating one or both of said mirrors about a position offset by a predetermined distance from the optical axis of the light.

3. A method of printing images as claimed in claim 2 wherein the predetermined angle of rotation of said optical path is 0° or 45° or −45° from the reference position and wherein the offset position is a point which is offset by 45 from the reference position and by a predetermined distance from the optical axis of the light.

4. A method of printing images as claimed in claim 1 wherein said mirrors provided opposite to each other are a pair of mirrors provided at the reference position, wherein another opposed pair of mirrors are provided in a juxtaposed relation with the first pair of mirrors at a predetermined angular position, and wherein the optical path is rotated by a predetermined angle by moving said mirrors to positions where the optical axes of two pairs of mirrors coincide with each other.

5. An apparatus for printing images on a web of printing material fed in parallel to a negative film, said apparatus comprising a light source for irradiating the negative film, a printing lens for adjusting the magnification of the light that has passed through the negative film, a composite mirror unit having a pair of mirrors arranged opposite to each other for changing the optical path of the light that has passed through the negative film, a driving means for rotating or moving at least one of said mirrors of said composite mirror unit to rotate the optical path by a predetermined angle from a reference position which is perpendicular to the negative film and the printing material, whereby an image obtained by rotating an image on the negative film by a predetermined angle can be printed on the printing material.

6. An apparatus for printing images as claimed in claim 5 wherein said composite mirror unit comprises a pair of mirrors for reversing the optical path, said driving means being capable of rotating said mirrors about a position which is offset by a predetermined angle from the reference position and by a predetermined distance from the optical axis of said light source.

7. An apparatus for printing images as claimed in claim 6, further comprising a plurality of paper magazines and feed means for changing the webs of paper to be fed from said respective paper magazines to an exposing unit, control means for moving the web of paper backward and forward according to the printing conditions when rotating images.

8. An apparatus for printing images as claimed in claim 5 wherein said composite mirror unit comprises a plurality of pairs of mirrors, one of said mirrors being rotatably mounted at the side of the optical axis of the light source, while the other of said mirrors, located at the side of the printing material, being fixedly mounted at different angular positions to which the optical path is intended to be rotated and wherein said driving means is for rotating said rotatable mirror about a position which is offset by a predetermined angle from the reference position and by a predetermined distance from the axis of said light whereby said rotatable mirror is selectively combined, by rotating it, with said fixed mirrors at the respective angular positions to form said plurality of pairs of mirrors.

9. An apparatus for printing images as claimed in claim 8, further comprising a plurality of paper magazines and feed means for changing the webs of paper to be fed from said respective paper magazines to an exposing unit, control means for moving the web of paper backward and forward according to the printing conditions when rotating images.

10. An apparatus for printing images as claimed in claim 5 wherein said composite mirror unit is an integral unit comprising a plurality of pairs of mirrors, one of said plurality of pairs of mirrors being fixed at the reference position, while the other pairs of mirrors being fixed in different angular positions to which the optical path is intended to be rotated, and wherein said driving means is for moving said integral unit along the negative film, so that by moving the composite mirror unit by the driving means, the optical path can be rotated by selectively using the pair of mirror at a predetermined angular position.

11. An apparatus for printing images as claimed in claim 10, further comprising a plurality of paper magazines and feed means for changing the webs of paper to be fed from said respective paper magazines to an exposing unit, control means for moving the web of paper backward and forward according to the printing conditions when rotating images.

12. An apparatus for printing images as claimed in claim 5, further comprising a plurality of paper magazines and feed means for changing the webs of paper to be fed from said respective paper magazines to an exposing unit, control means for moving the web of paper backward and forward according to the printing conditions when rotating images.

13. An apparatus for printing images as claimed in claim 12 wherein the steps of rotating the images, changing the magnification of printing and changing the webs of paper are automatically carried out in response to signals from a detecting device for changing the print size and the film type.

14. An apparatus for printing images as claimed in claim 13 wherein said signals are signals from a switch circuit connected to a control circuit.

* * * * *